United States Patent [19]
Cross et al.

[11] Patent Number: 5,746,275
[45] Date of Patent: May 5, 1998

[54] THREE-POINT HITCH FOR AN ALL TERRAIN VEHICLE

[75] Inventors: Gary Cross, Estherville; Ken Sloan, Milford, both of Iowa

[73] Assignee: Cycle Country Accessories Corp., Milford, Iowa

[21] Appl. No.: 662,046

[22] Filed: Jun. 12, 1996

[51] Int. Cl.[6] .................................. A01B 59/043
[52] U.S. Cl. .................. 172/440; 172/445.1; 172/246; 172/247; 280/497; 280/503
[58] Field of Search ............... 172/439, 445.1, 172/445.2, 448, 450, 442, 440, 245, 246, 247; 280/495, 497, 503

[56] References Cited

U.S. PATENT DOCUMENTS

| | | | |
|---|---|---|---|
| 2,743,117 | 4/1956 | Hutchings | 172/439 X |
| 3,630,290 | 12/1971 | Williams et al. | 172/439 X |
| 3,688,847 | 9/1972 | Deeter | 172/817 |
| 3,708,017 | 1/1973 | Alexandrovsky et al. | 172/439 X |
| 3,983,943 | 10/1976 | Van Der Lely | 172/439 X |
| 4,019,755 | 4/1977 | Eisenhardt | 172/439 |
| 4,194,757 | 3/1980 | Lucas et al. | 172/439 |
| 5,209,307 | 5/1993 | Hotte | 172/445.2 |
| 5,267,747 | 12/1993 | Thorn | 280/503 X |
| 5,346,018 | 9/1994 | Koster | 172/439 X |
| 5,423,394 | 6/1995 | Kendle | 172/439 X |
| 5,538,264 | 7/1996 | Brown et al. | 280/503 X |

OTHER PUBLICATIONS

Orthman Multi–Use Ram Hitch brochure p. 1, Sep. 1989
Worksaver 3–Point Adapter Kits, pp. 1 & 2, (AK–11062 Heavy Duty Adapter Kit), Jan. 1989.

*Primary Examiner*—Terry Lee Melius
*Assistant Examiner*—Victor Batson
*Attorney, Agent, or Firm*—Zarley, McKee, Thomte, Voorhees & Sease; Dennis L. Thomte

[57] ABSTRACT

A three-point hitch for an all terrain vehicle (ATV) comprising a mounting frame which is attached to the axle housing of the ATV. The mounting frame is supported on the tongue hitch of the ATV and is attached to the body of the ATV so that the rear suspension of the ATV is locked-out. The multiple-point hitch is operatively secured to the mounting frame and is raised and lowered by means of an electromechanical screw actuator. The multiple-points of the hitch are free to float, in some situations, with respect to the mounting frame and the ATV.

11 Claims, 6 Drawing Sheets

THREE-POINT HITCH FOR AN ALL TERRAIN VEHICLE

BACKGROUND OF THE INVENTION

1. Field of the Invention

This invention relates to a three-point hitch and more particularly to a three-point hitch which may be attached to an all terrain vehicle (ATV) to enable the ATV to have implements or tools vertically movably mounted at the rear end thereof.

2. Description of the Related Art

ATV's are gaining in popularity and are used extensively by farmers, gardeners, ranchers, sportsmen, etc. Most ATV's have a tongue-like hitch secured to the rear end of the vehicle so that the vehicle may pull a trailer or the like. Many ATV's have also been equipped with a three-point hitch at the rearward end thereof to enable the vehicle to support a disk, plow, or the like, with the three-point hitch having the capability to raise or lower the implement with respect to the ground. Although the prior art three-point hitches for ATV's have been extensively used, the prior art three-point hitches suffer from certain drawbacks. First, the prior art three-point hitches are not believed to be readily mountable on the ATV. Further, the prior art ATV three-point hitches are not believed to be able to provide the necessary "pull-down" force sometimes needed to cause the implement to be sufficiently forced into ground engagement. Further, it is not believed that the prior art ATV three-point hitches have the desirable "float" capability which is sometimes needed. Lastly, it is not believed that the ATV three-point hitches of the prior art have the capability of locking-out the rear suspension system of the ATV, even though the rear suspension system of the ATV introduces considerable variables into the depth of penetration of the implement carried by the hitch due to the weight of the operator and the weight of the implement.

SUMMARY OF INVENTIONS

A three-point hitch is provided for use on an all terrain vehicle (ATV). The three-point hitch of this invention is quickly and easily mounted on the ATV and includes a supporting frame structure which is rigidly attached to the axle housing of the vehicle and which is also attached to the body of the vehicle so that the rear suspension system of the vehicle is "locked-out". The hitch of this invention includes an electrically operated screw actuator which is capable of raising and lowering the implement attachment points of the hitch. Further, the hitch of this invention includes a power "pull-down" so that sufficient downward force may be applied to the implement carried by the hitch to enable the implement to satisfactorily perform its intended function. Further, the three-point hitch disclosed herein includes a "float" capability to enable the implement to operate with or without downward pressure by simply removing or not removing a pin. Such a feature allows certain equipment, such as a moldboard plow, to operate more effectively.

It is therefore a principal object of the invention to provide an improved three-point hitch for an all terrain vehicle.

Still another object of the invention is to provide a three-point hitch for an all terrain vehicle which includes means for "locking-out" the rear suspension system of the vehicle.

Still another object of the invention is to provide a three-point hitch for an all terrain vehicle including a power "pull-down" mechanism.

Still another object of the invention is to provide a three-point hitch for an all terrain vehicle including a built-in float feature.

Still another object of the invention is to provide a three-point hitch of the type described which is economical of manufacture, durable in use and refined in appearance.

These and other objects will be apparent to those skilled in the art.

DESCRIPTION OF THE PREFERRED EMBODIMENT

Figure 1:
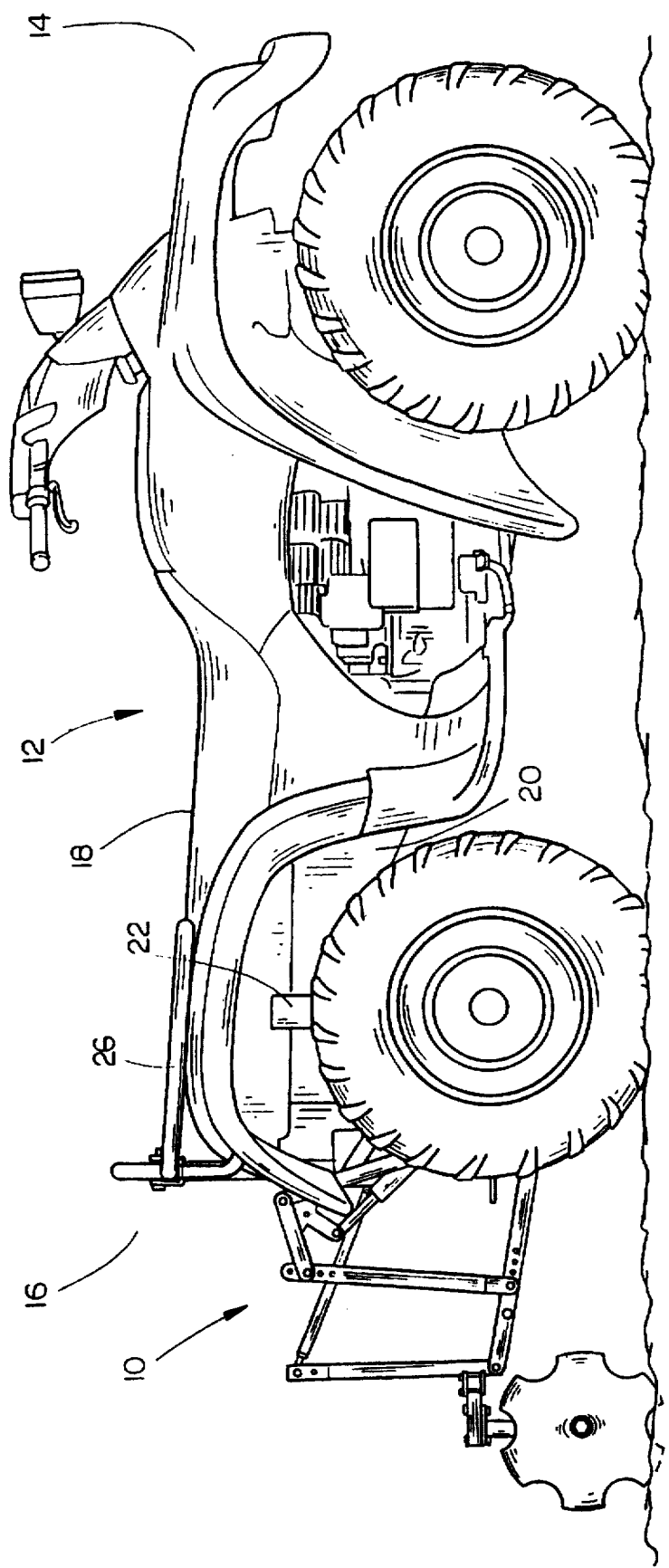
FIG. 1 is a side view of an all terrain vehicle having the three-point hitch of this invention mounted thereon.
Figure 2:
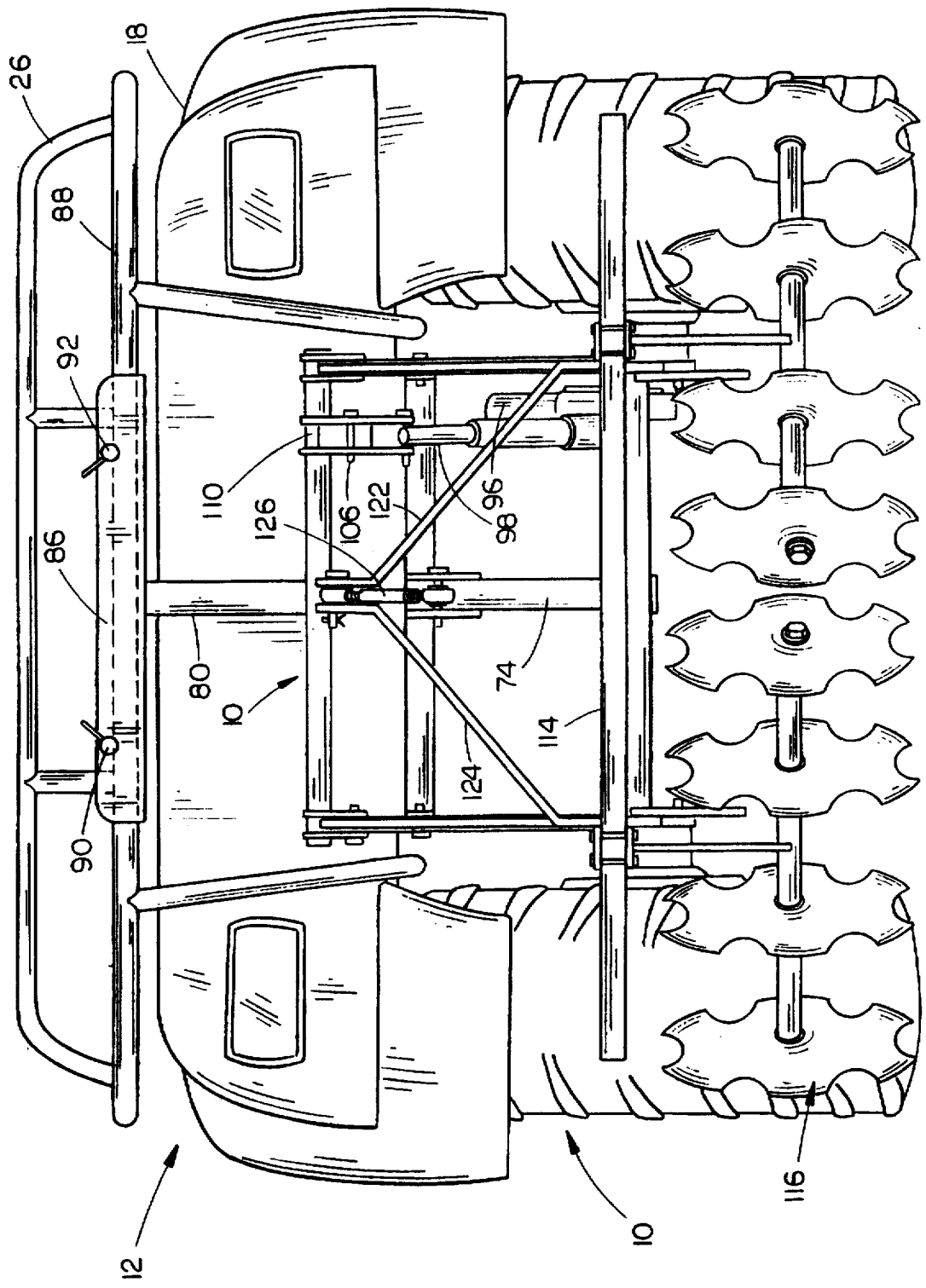
FIG. 2 is a rear view of the all terrain vehicle of FIG. 1 having the three-point hitch of this invention mounted thereon.

The three-point hitch of this invention is referred to generally by the reference numeral 10 while the reference numeral 12 refers to a conventional all terrain vehicle (ATV) having a forward end 14 and a rearward end 16. For purposes of description, vehicle 12 will be described as including a body 18 mounted on a frame 20. Vehicle 12 also includes a conventional rear suspension system 22 which normally consists of a pair of shock absorbers or the like which extend between the body 18 and the frame 20 to permit the rearward end of the body 18 to move upwardly and downwardly with respect to the frame 20 and vice versa. The vehicle 12 also includes a conventional suspension system at the forward end thereof. Further, the vehicle 12 includes a suitable source of electrical power.

The rear wheels of the vehicle 12 are mounted on the opposite ends of axles which are normally enclosed with an axle housing referred to generally by the reference numeral 24. For purposes of description, axle housing 24 will be described as a single axle housing, but it should be understood that a pair of axle housings would normally extend laterally outwardly from a gearbox or differential, depending upon the particular type of ATV utilized. For purposes of description, body 18 will be described as including a rear rack or support 26 which is secured to the rearward end of the body 18, as seen in the drawings. As will be described hereinafter, the three-point hitch 10 of this invention is secured to axle housing 24, rack 26, and a tongue-like hitch 68.

Figure 3:
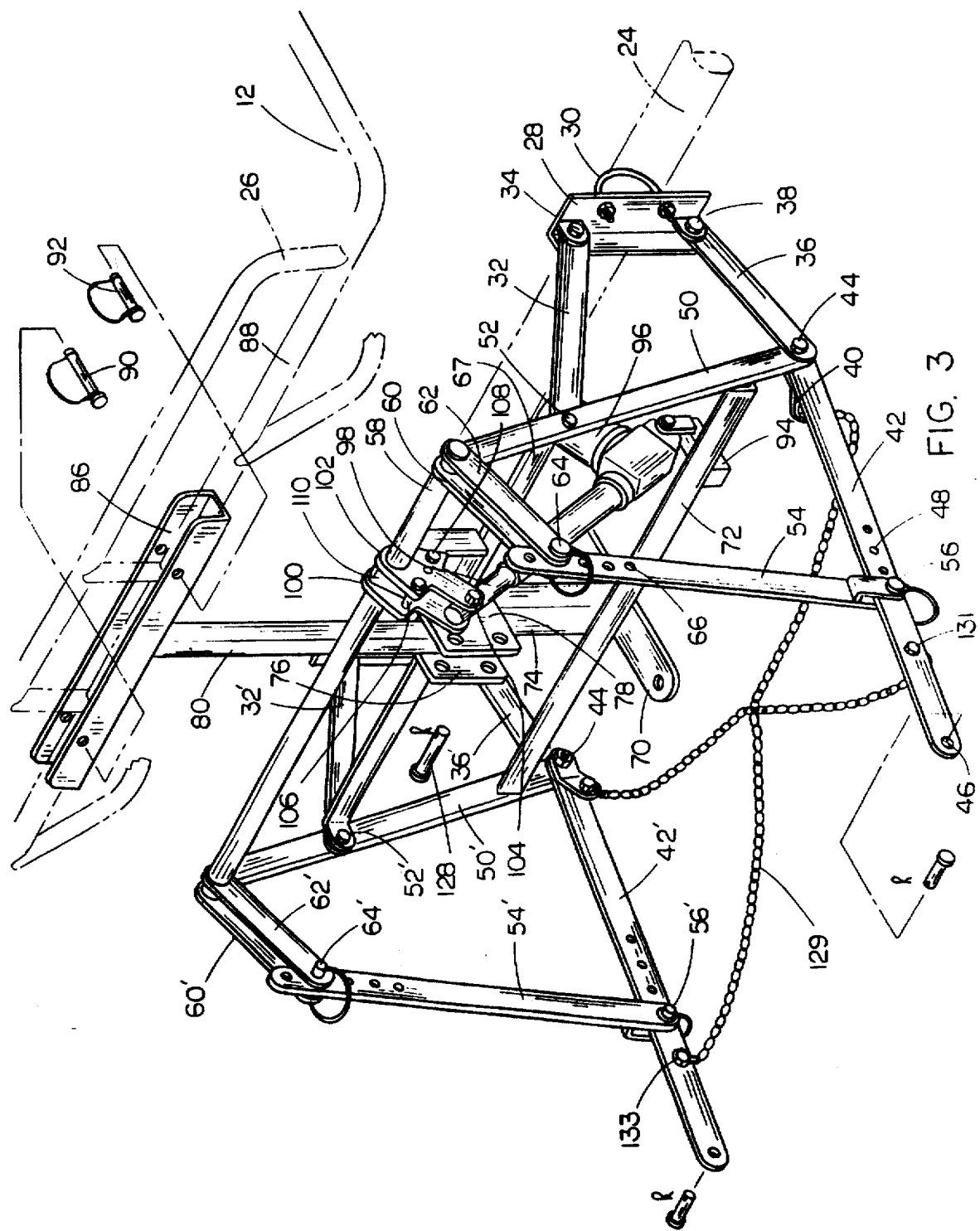
FIG. 3 is a rear perspective view of the three-point hitch of this invention.

Hitch 10 includes a bracket 28 having upper and lower ends and which is secured to the axle housing 24 by U-bolt assembly 30. Arm 32 is pivotally connected at its forward end to the upper end of bracket 28 by pin 34. The forward end of arm 36 is pivotally connected to the lower end of bracket 28 by means of pin 38. The numeral 40 refers to a small angle bracket which will be described in more detail hereinafter. The forward end of lower lift arm 42 is secured to arm 36 by bolt 44, as seen in FIG. 3. Arm 42 has an opening 46 at its rearward end and a plurality of horizontally spaced openings 48. The lower end of arm 50 is secured to arms 36 and 42 by the bolt 44 which extends therethrough, as seen in FIG. 3. The rearward end of arm 32 is pivotally connected to arm 50 by means of bolt 52. The lower end of arm 54 is selectively adjustably secured to arm 42 by means of the pin 56 extending through openings in the lower end of arm 54 and extending through one of the openings 48.

One end of shaft 58 is rotatably mounted in the upper end of arm 50 and has a pair of links 60 and 62 welded thereto and which extend rearwardly therefrom, as best seen in FIG. 3. The rearward ends of links 60 and 62 are selectively vertically adjustably secured to the upper end of arm 54 by means of the pin 64 extending through the rearward ends of the links 60 and 62 and through one of the openings 66 formed in the upper end of arm 54. One end of brace 67 is connected to the arms 32 and 50 by means of the bolt 52. Bracket 28' is secured to axle housing 24 by means of a U-bolt assembly 30' (not shown) and has the rearward end of arm 32' secured thereto by means of a pin 34' (not shown). Arm 36' is secured to the lower end of bracket 28' by means of pin 38' (not shown) and extends rearwardly therefrom. Arms 42' and 50' are secured to the rearward end of arm 36' by means of bolt 44'. The lower end of arm 54' is connected to arm 42' by means of pin 56'. Links 60' and 62' are welded or otherwise secured to the end of shaft 58 which is rotatably mounted in the upper end of arm 50'. The rearward ends of links 60' and 62' are connected to the upper end of the arm 54' by means of the pin 64'. The other end of brace 67 is secured to arm 32' and arm 50' by means of the bolt 52'.

The three-point hitch 10 of this invention is also secured to the ATV 12, as will now be explained. ATV 12 includes a tongue-like hitch 68 which extends rearwardly 20 from the axle housing 24 in conventional fashion. The rearward end of hitch 68 is provided with a hitch pin opening formed therein. Three-point hitch 10 includes a tongue member 70 which is bolted to hitch 68 by means of bolt 71. An elongated angle member 72 has its opposite ends welded or otherwise secured to the inside surfaces of arms 50 and 50' and is welded to the upper surface of tongue member 70. Vertically disposed post 74 is secured to tongue member 70 and extends upwardly therefrom. A pair of rearwardly extending plates 76 and 78 are welded or otherwise secured to the upper end of post 74 and extend rearwardly therefrom, as seen in FIG. 3. Each of the plates 76 and 78 are provided with openings formed in the rearward ends thereof, as also seen in FIG. 3. Tubular member 80 is welded to the plates 76 and 78 and extends upwardly therefrom (FIG. 3). The tubular member 80 has a U-shaped channel 86 welded to the upper end thereof. As seen in the drawings, the channel 86 receives tubular member 88 of rack 26. Pins 90 and 92 extend through the channel 86 to maintain the tubular member 88 therein.

Support 94 is welded to brace 72 and has an electric motor 96 secured thereto, as seen in FIG. 3. Electric motor 96 includes a screw actuator shaft 98 which movably extends therefrom and which is secured to a pair of plates 100 and 102 by means of bolt 104. The forward ends of plates 100 and 102 are freely rotatably mounted on the shaft 58 and have a pair of bolts or pins 106 and 108 extending therebetween. Arm 110 is welded to shaft 58 between plates 100 and 102 and extends rearwardly therefrom between the bolts or pins 106 and 108. Normally, bolt or pin 108 will be left in place while pin 106 is normally selectively removably mounted.

Figure 4:
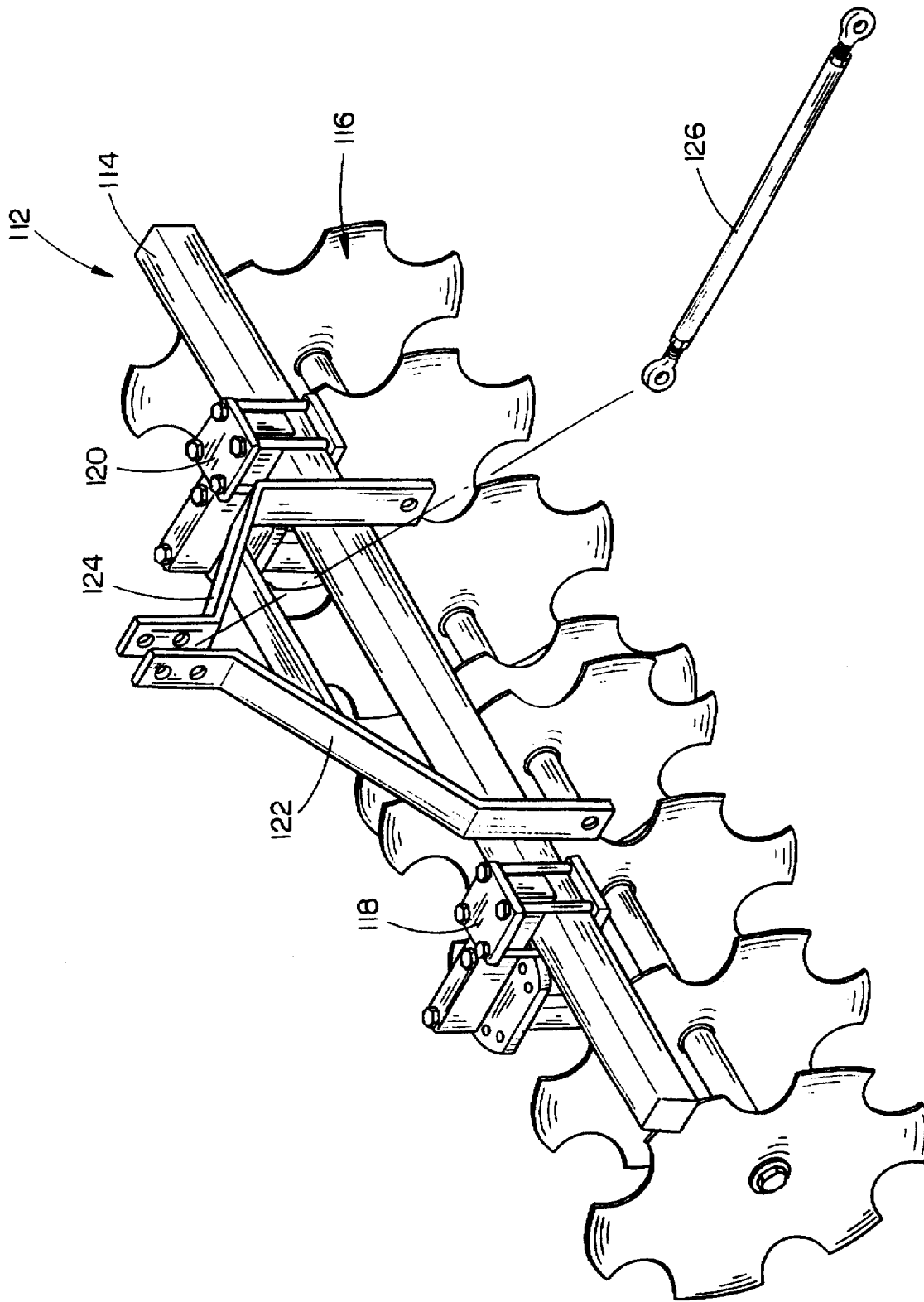
FIG. 4 is a front perspective view of a portion of a tool bar implement attachment for use on the hitch.
Figure 5:
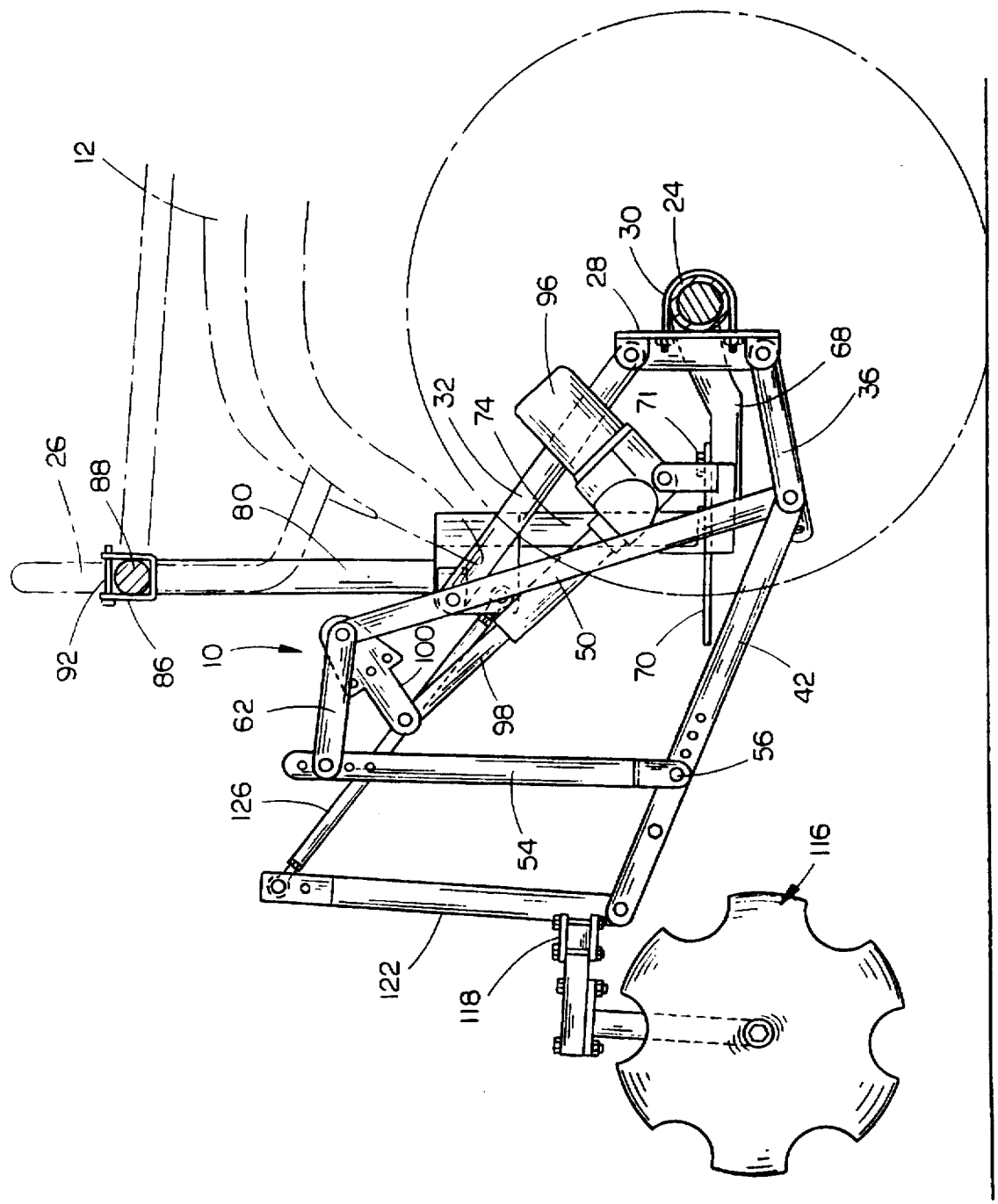
FIG. 5 is a side elevational view of the three-point hitch of this invention in its raised position.
Figure 6:
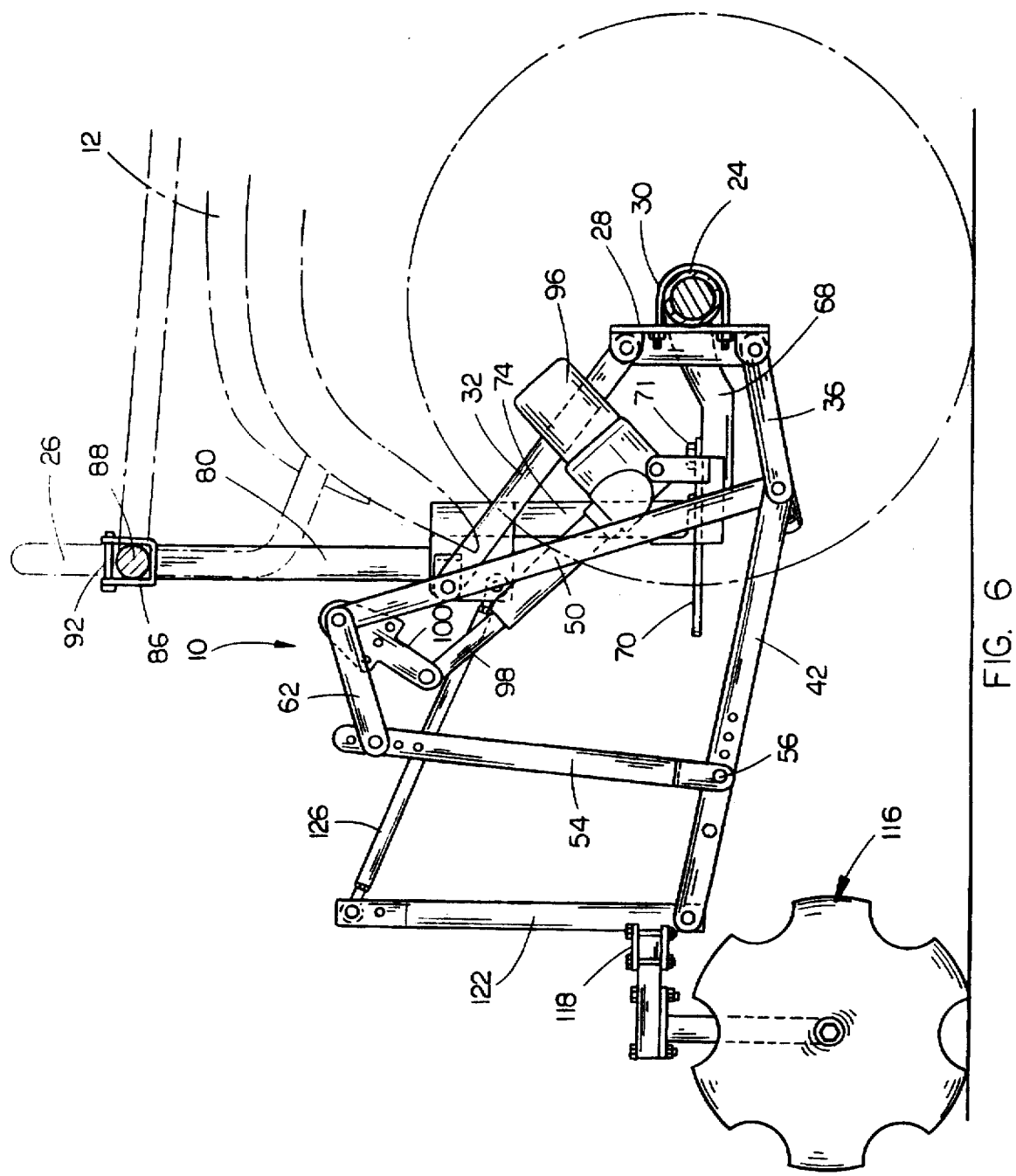
FIG. 6 is a view similar to FIG. 5 except that the three-point hitch has been lowered with respect to that shown in FIG. 5.

FIG. 4 illustrates one type of attachment which may be attached to the three-point hitch 10 and is generally referred to by the reference numeral 112. Attachment 112 includes a transversely extending tool bar 114 having the disc assembly 116 mounted thereon by brackets 118 and 120. Arms 122 and 124 are welded to the forward side of tool bar 114 and have their upper ends adapted to receive one end of length adjustable link 126. The other end of link 126 is adapted to be secured to the rearward ends of the plates 76 and 78 by means of pin 128. The tool bar 114, arms 122 and 124, and link 126 form the basic part of most attachments which may be secured to the three-point hitch. For example, the disc assembly 116 may be removed from the beam 114 and a different attachment secured thereto such as a cultivator shovel, etc.

The hitch 10 of this invention is quickly and easily mounted on the ATV 12 by simply clamping the brackets 28 and 28' to the axle housing 24 or housings if the ATV has a pair of axle housings. In those situations where the ATV does not have axle housings, the brackets 28 and 28' would be secured by any convenient means to the frame of the ATV. During the mounting of the hitch 10 on the ATV 12, the tongue member 70 is secured to the hitch 68 by bolt 71 with the post 74 extending upwardly therefrom to further support the hitch 10. The U-shaped channel 86 is also positioned so that it receives the tubular member 88 of rack 26 with the pins 90 and 92 maintaining that connection.

As seen, brackets 40 and 40' are mounted at the inside rearward ends of arms 36 and 36', respectively, and are maintained thereon by bolts 44 and 44'. The numeral 129 refers to an X-shaped stabilizing chain which is secured by brackets 40, 40' and bolts 131 and 133, as seen in FIG. 3.

Actuation of the electric motor 96 in a first direction causes the screw actuator shaft 98 to be extended therefrom so that the rearward ends of the plates 100 and 102 are moved upwardly. Upward movement of the rearward ends of plates 100 and 102 causes the rearward ends thereof to freely rotate about shaft 58 until bolt or pin 108 engages the underside of actuator arm 110. Continued upward movement of the plates 100 and 102 by the screw actuator shaft 98 will cause the rearward end of the actuator arm 110 to be moved upwardly which will cause the shaft 58 to be rotated in a clockwise direction, as viewed in FIG. 3, so that the links 60, 62, 60' and 62' will cause the arms 54 and 54' to be moved upwardly which will cause the rearward ends of the lower lift arms 42 and 42' to be moved upwardly. When pin 106 is removed from the plates 100 and 102, the lower lift arms 42 and 42', and the implement attached thereto, may float or move downwardly with respect to the ATV. If it is desired to apply "pull-down" pressure on the lower lift arms 42 and 42', and the implement attached thereto, pin or bolt 106 is installed in the plates 100 and 102 with downward movement of the actuator shaft 98 causing the rearward ends of the brackets 100 and 102 to be moved downwardly which will bring the pin or bolt 106 into engagement with the upper surface of the rearward end of actuator arm 110 which will cause the shaft 58 to be rotated in a counterclockwise direction, as viewed in FIG. 3.

The engagement of the U-shaped channel 86 with the rack 26 "locks-out" the rear suspension system of the vehicle which provides consistent operation of the implement or equipment attached to the three-point hitch 10, where the weight of the operator or the downward or upward force generated by the equipment will not affect the distance from the ground surface to the highest and lowest points of the three-point hitch in its raised and lower positions. Although it is described that the U-shaped channel 86 engages the rack, if the ATV does not have a rack, the U-shaped channel 86 or some other structure could be secured to the body of the ATV 10 to "lock-out" the rear suspension of the vehicle.

Further, although it has been described that the means for raising and lowering the hitch is accomplished by an electric screw actuator, a hydraulic cylinder or the like could be utilized if the ATV is equipped with a hydraulic pump system.

During the operation of the hitch, the length adjustable link 126 extends from the plates 76 and 78 to the upper ends of the arms 122 and 124. The tool bar construction utilized with the hitch enables various implements such as discs, furrowers, cultivators or plows to be quickly and easily mounted thereon. Thus it can be seen that a novel three-point hitch has been provided which accomplishes at least all of its stated objectives.

We claim:

1. In combination:

an all terrain vehicle having rearward and forward ends and including a wheeled frame, a body mounted on said wheeled frame, and a suspension system mounting said body on said wheeled frame;

a three-point hitch mounted on the rearward end of said vehicle including mounting means for mounting said hitch on said vehicle and selectively vertically movable attachment points extending rearwardly from said mounting means;

said mounting means including means for locking out said suspension system to prevent relative movement between the rearward ends of said wheeled frame and said body.

2. In combination:

an all terrain vehicle having rearward and forward ends and including a wheeled frame, a body mounted on said wheeled frame, and a suspension system mounting said body on said wheeled frame;

a three-point hitch mounted on the rearward end of said vehicle including mounting means for mounting said hitch on said vehicle and selectively vertically movable attachment points extending rearwardly from said mounting means;

said mounting means including means for permitting said attachment points to float with respect to said vehicle;

said mounting means also including means for selectively locking out said suspension system to prevent relative movement between the rearward ends of said wheeled frame and said body.

3. The combination of claim 2 wherein said means for permitting said attachment points to float is selective.

4. The combination of claim 2 wherein a horizontally disposed and transversely extending tool bar is operatively secured to said attachment points, and an earth working implement is selectively movably mounted on said tool bar.

5. The combination of claim 2 wherein said means for selectively locking out said suspension system comprises rigid means secured to and extending between said wheeled frame and said body.

6. The combination of claim 5 wherein said body of said vehicle includes a rack mounted on the rearward end thereof and further includes a tongue-like hitch extending rearwardly from said wheeled frame, said rigid means operatively secured to and extending between said tongue-like hitch and said rack.

7. In combination:

an all terrain vehicle having rearward and forward ends and opposite sides;

said vehicle including an engine, a wheeled frame, a body mounted on said wheeled frame, front and rear suspension systems mounting said body on said wheeled frame, and a tongue-like hitch extending rearwardly from said wheeled frame;

and a multiple-point hitch mounted on the rearward end of said vehicle;

a first mounting means secured to said wheeled frame, said first mounting means including elongated, rearwardly extending, upper and lower arms having rearward and forward ends;

an upstanding first elongated arm having upper and lower ends;

said first elongated arm being secured, adjacent its lower end, to said lower arm adjacent the rearward end thereof, the rearward end of said upper arm being secured to said first elongated arm below the upper end thereof;

at least a second mounting means secured to said wheeled frame, said second mounting means including elongated, rearwardly extending, upper and lower arms having rearward and forward ends, an upstanding second elongated arm having upper and lower ends, said second elongated arm being secured, adjacent its lower end, to said lower arm of said second mounting means adjacent the rearward end thereof, the rearward end of said upper arm of said second mounting means being secured to said second elongated arm below the upper end thereof;

an elongated, horizontally disposed shaft rotatably mounted on said first and second elongated arms adjacent the upper ends thereof;

a first linkage having rearward and forward ends, said forward end of said first linkage being rigidly secured to said shaft, adjacent one end thereof, for rotation therewith;

a second linkage having rearward and forward ends, said forward end of said second linkage being rigidly secured to said shaft, adjacent the other end thereof, for rotation therewith;

an upstanding third linkage having upper and lower ends, said third linkage being pivotally secured, adjacent its upper end, to the rearward end of said first linkage;

an upstanding fourth linkage having upper and lower ends, said fourth linkage being pivotally secured, adjacent its upper end, to the rearward end of said second linkage;

a first lower lift arm having rearward and forward ends, the forward end of said first lower lift arm being pivotally secured to the connection between said lower arm of said first mounting means and said first elongated arm;

said lower end of said third linkage being pivotally secured to said first arm forwardly of the rearward end thereof;

a second lower lift arm having rearward and forward ends, the forward end of said second lower lift arm being pivotally secured to the connection between said lower arm of said second mounting means and said second elongated arm;

said lower end of said fourth linkage being pivotally secured to said second lower lift arm forwardly of the rearward end thereof;

an actuator having rearward and forward ends, the forward end of said actuator being secured to said shaft between said first and second linkages;

means operatively secured to said actuator at the rearward end thereof for causing rotation of said shaft and for vertically moving the rearward ends of said first and second lower lift arms;

and suspension lock-out means operatively secured to said first and second mounting means and said body of said vehicle for preventing relative movement between said wheeled frame and said body.

8. The combination of claim 7 wherein a tongue extension is secured to said tongue-like hitch of said vehicle, and an upstanding support secured to said tongue extension and which extends upwardly therefrom; a bracket secured to said upstanding support for pivotally receiving one end of an elongated connector link, the other end of which forms the third point of the multiple-point hitch.

9. The combination of claim 8 wherein an elongated, horizontally disposed brace is secured to and extends between said first and second elongated arms, said brace being secured to said tongue extension.

10. The combination of claim 7 wherein said actuator comprises vertically disposed and horizontally spaced-apart plates rotatably mounted on said shaft, said plates having rearward and forward ends and upper and lower ends, an elongated actuator arm having rearward and forward ends, the forward end of said actuator arm being secured for rotation therewith, to said shaft between said plates, a first pin means extending between said plates adjacent the lower ends thereof below said actuator arm, whereby upward movement of the rearward ends of said plates will cause said first pin means to engage the underside of said actuator arm to cause said shaft to be rotated in a direction which will cause said lower lift arms to be raised.

11. The combination of claim 10 wherein a removable second pin means may be extended between said plates adjacent the upper edges thereof above said actuator arm so that downward movement of the rearward ends of said plates will cause said lower lift arms to be forced downwardly.

* * * * *